United States Patent [19]

Ono et al.

[11] Patent Number: 4,769,898
[45] Date of Patent: Sep. 13, 1988

[54] METHOD OF PRODUCING A MAGNETIC HEAD

[75] Inventors: Mitsuaki Ono, Katano; Masataka Ueda, Okayama; Osamu Miyazaki, Kadoma, all of Japan

[73] Assignee: Matsushita Electric Industrial Co., Ltd., Osaka, Japan

[21] Appl. No.: 41,283

[22] Filed: Apr. 22, 1987

Related U.S. Application Data

[62] Division of Ser. No. 856,341, Apr. 28, 1986.

[30] Foreign Application Priority Data

Apr. 30, 1985 [JP] Japan .................. 60-93014

[51] Int. Cl.$^4$ .............................................. G11B 5/42
[52] U.S. Cl. ...................................... 29/603; 360/119
[58] Field of Search ............... 29/603; 360/125–127, 360/119, 120, 122

[56] References Cited

U.S. PATENT DOCUMENTS 4,425,701 1/1984 Takahashi et al. ................. 29/603
4,682,256 7/1987 Ayabe ................................ 29/603 X

FOREIGN PATENT DOCUMENTS 0125891 11/1984 European Pat. Off. .
0161127 9/1983 Japan .................................. 360/127
0175122 10/1983 Japan .................................. 360/127
0089807 5/1985 Japan .................................. 29/603

OTHER PUBLICATIONS

Patent Abstracts of Japan, vol. 8, No. 27 (P-252 (1464), 4th Feb. 1984; JP-A-58 182-25-10-1983.

Primary Examiner—Carl E. Hall
Attorney, Agent, or Firm—Stevens, Davis, Miller & Mosher

[57] ABSTRACT

In a magnetic head comprising a head gap and a magnetic core composed of both a high permeability ferrite and a magnetic alloy, said magnetic alloy being disposed in the vicinity of said head gap,
the improvement comprising a corrugation provided at a junction portion between said ferrite and said magnetic alloy, a height of said corrugation being not less than a value of the longest wavelength of luminance signals and color signals recorded on a magnetic recording medium, a distance defined between adjacent two crests or bottoms of said corrugation being smaller than a width of a head track.

4 Claims, 5 Drawing Sheets

METHOD OF PRODUCING A MAGNETIC HEAD

This is a Division of application Ser. No. 856,341 filed Apr. 28, 1986.

BACKGROUND OF THE INVENTION

The present invention relates to a magnetic head for use in a magnetic recording and reproducing unit and a method of making the same and provides a magnetic head which is excellent in the efficiency of recording data onto a magnetic tape having high coercive force and of reproducing the recorded data, by constructing the magnetic head core by use of both a high permeability ferrite magnetic material and a magnetic alloy having a high saturation magnetic flux density such as a amorphous alloy or the like.

Magnetic tapes made of Fe or Co alloy powder have been used in practice to improve the recording density but a coercive force Hc of a magnetic tape made of the alloy powder becomes a high value ranging from 1300 to 1500 Oe. In order to record/reproduce the signal to/from such a high Hc tape, a metal head wherein a sendust or an amorphous material is used is useful, and conventially metal heads of a variety construction have been proposed. However, in case the head core is formed solely of the magnetic alloy, the eddy current loss is great and in case it is used in the range of high frequency such as in video signal, characteristics of the head is remarkably damaged. Consequently, in such head it is proposed to adopt a combination of both the ferrite magnetic material and the magnetic alloy material, in which only a head gap portion is made of the magnetic alloy and the other head core portion is made of the ferrite magnetic material. In the magnetic head according to this construction, the bonding portion between the ferrite materail and the magnetic alloy acts as the pseudo-gap and picks up interface signals, which deteriorates the SN ratio. To eliminate such problem, in the magnetic head described in Japanese Patent Laid-Open Publication No. 155513/1983, a protrusion is provided on the surface of the ferrite by mechanical processing and a magnetic alloy material is deposited on both side faces of the above protrusion by sputtering to form a head gap by the above alloy magnetic layer so that the head gap and the junction portion between the ferrite and the magnetic alloy are not parallel to each other. Besides, in Japanese Patent Laid-Open Publication No. 175122/1983, grooves are provided along a ferrite material, and a magnetic alloy material is filled within the above grooves to obtain the similar effect as in the above prior art. Further, in Japanese Patent Laid-Open Publication No. 125906/1985, an inclined portion is provided on the surface of the ferrite by mechanical processing, and on the inclined portion a magnetic alloy material is deposited to have a thickness corresponding to a track width of the head, while the head gap portion is formed of a magnetic alloy material, and a head gap and a junction portion formed between the ferrite and the magnetic alloy materials are made unparallel to each other. However, any one of the above-described prior arts involves a complicated process in manufacturing the head, showing disadvantages in applying it to the mass production.

SUMMARY OF THE INVENTION

An object of the present invention is to eliminate the prior art problem caused in the composite type magnetic head composed of the magnetic core made of, for example, a Mn-Zn ferrite and a magnetic alloy such as amorphous magnetic alloy, i.e., problems of the reduction of SN ratio with respect to recording and reproducing signal due to the action of the junction of both magnetic materials as the pseudo-gap, while providing a magnetic head appropriate for the mass production and a method of making the same.

Another object of the present invention is to provide a composite type magnetic head composed of the Mn-Zn ferrite and the magnetic alloy such as the amorphous alloy and a method of making the same, wherein during recording, it is possible to provide a recording magnetic field by which even in a case of the metal tape having the high Hc the magnetic head can sufficiently record thereon while the loss suffered during reproducing can be reduced to thereby obtain a great reproduction output.

The above and other objects and features of the invention will appear in the following description and appended claims, reference being made to the accompanying drawings forming a part of this specification wherein like reference characters designate corresponding parts in the several views.

In the magnetic head according to the present invention, the magnetic core is formed of both a high permeability ferrite and a magnetic alloy, and the magnetic alloy is disposed adjacent the head gap. A corrugated portion is provided along the junction portion between the above ferrite and the magnetic alloy, while a height of the corrugated portion is made equivalent to or more than the longest wavelength in both luminance signals and color signals which are recorded on the magnetic recording medium, and a distance between two adjacent crests or bottoms of the corrugation is made smaller than the width of a head track. Furthermore, the method of making the magnetic head according to the present invention comprises following seven steps: a first step of forming a parallel slit-like resist coating film having a pitch smaller than a width of track of the magnetic head, on a face Q of a parallelopipedon-shaped block made of the high permeability ferrite, and subjecting the ferrite block to electrolytic etching within an electrolytic solution to form a corrugation having a height not less than a value of the longest wavelength or luminance signals and color signals recorded on a tape; a second step of providing a layer of a magnetic alloy such as an amorphous magnetic alloy by sputtering on said corrugation; a third step of providing grooves along an edge including the magnetic alloy layer, substantially parallelly to said corrugation to define a track having a predetermined width; a fouth step of filling a nonmagnetic material in said grooves, and polishing said face Q to form a mirror-like face to thereby provide a first magnetic core portion; a fifth step of preparing a second magnetic core produced in the same manner as in the first magnetic core while providing a groove for a coil winding on a face Q of said second magnetic core portion, and providing a gap material of a predetermined thickness on the face Q of at least one of the first and second magnetic core portions; a sixth step of bonding the first and second magnetic core portions through the gap material so that the tracks of said magnetic core portions abut each other, to thereby form a gap bar having a gap between the first and second magnetic core portions; and seventh step of slicing said gap bar at a predetermined angle regarding the gap.

Furthermore, according to the present invention, in order to obtain excellent recording and reproducing characteristics with respect to high Hc metal tapes, the magnetic core is formed by use of both high permeability ferrite and magnetic alloy, a head gap portion being formed of the magnetic alloy. To limit the track width of the head, the notched grooves are provided at both end portions of the gap, and within the groove a nonmagnetic material such as glass or the like is filled. Further, a length of the magnetic alloy from the surface of the head in the direction of the depth of the gap is made smaller than a distance between the surface of the head and the lower end of a window for a coil winding and also smaller than a length of the notched groove with respect to the direction of depth of the gap.

The construction, features and advantages of the invention will now be described hereinafter in more detail, refering to the appended drawings.

DETAILED DESCRIPTION OF THE EMBODIMENTS

Figure 1A:
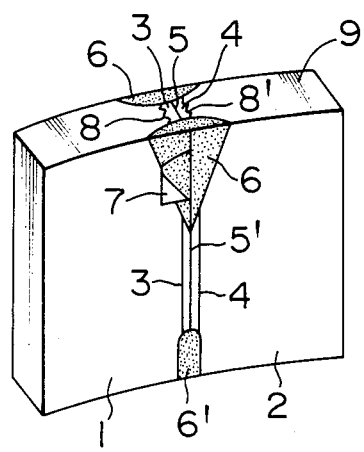
FIGS. 1a and 1b show a perspective view, illustrating an embodiment of the magnetic head according to the invention.
Figure 1B:
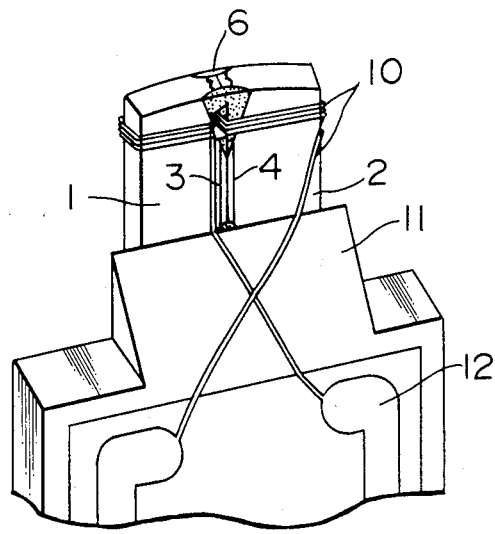
Figure 2:
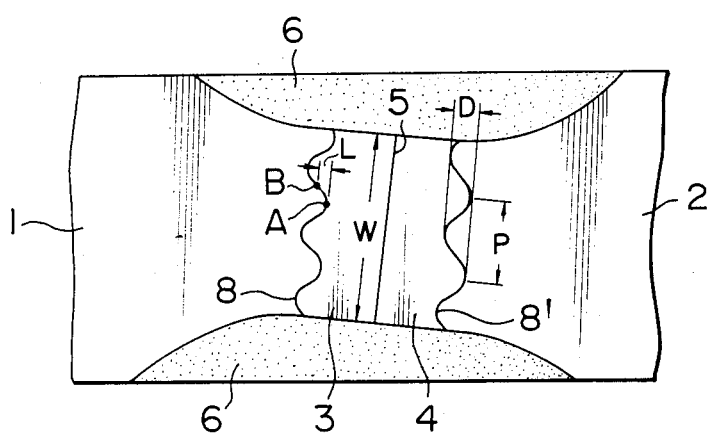
FIG. 2 shows an enlarged view, illustrating a head gap portion of the sliding contact surface according to the invention.
Figure 3A:
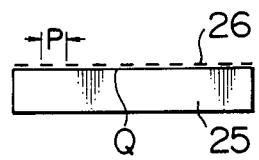
FIGS. 3a, 3b, 3c, 3d, 3e, 3f and 3g show views, illustrating an example of the manufacturing process of the head according to the present invention.
Figure 3B:
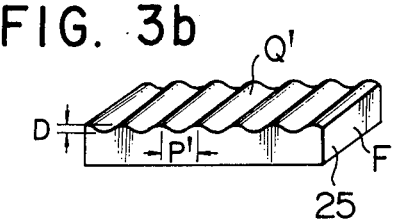
Figure 3C:
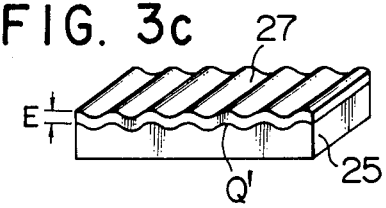
Figure 3D:
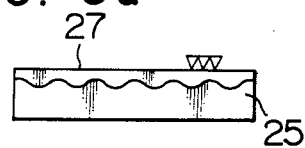
Figure 3E:
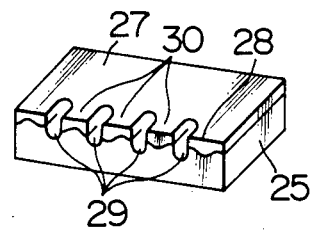
Figure 3F:
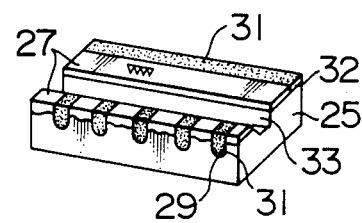
Figure 3G:
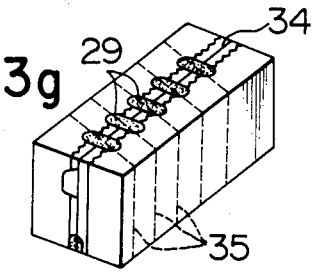

FIGS. 1a and 1b are enlarged perspective views illustrating an example of the magnetic head according to the invention, in which FIG. 1a there are removed coil windings 10 and terminals 12. In FIG. 1a, reference numerals 1 and 2 show the magnetic core made of the Mn-Zn ferrite material. Magnetic alloys 3 and 4 such as the amorphous alloy of $Co_{82.9} Nb_{10.9} Zr_{4.0} Ta_{2.2}$ or sendust of $Fe_{85} Si_{9.5} Al_{5.5}$, which have a highly saturation magnetic flux density was deposited by sputtering on the faces opposed to the head gap 5 of those cores 1 and 2, and the thin layer of the non-magnetic material such as the glass or the like was provided between the magnetic alloy 3 and 4 in a predetermined thickness to define the head gap 5. 6 and 6' show bonding members for bonding the left and right magnetic cores with each other and a glass was mainly used as the bonding member. 7 shows a window for coil winding. In FIG. 1, magnetic alloys 3 and 4 were disposed above the window 7 (i.e. at both sides of the head gap 5) and at both sides of the rear gap 5' which is located below the window 7. 9 shows a sliding contact surface in sliding contact with the magnetic tape and FIG. 2 shows the enlarged plan view of the adjacent portion of the gap of the sliding contact surface 9.

The magnetic head according to the present invention is characterized in that the boundary portion between magnetic cores 1 and 2 and the magnetic alloys 3 and 4 is shaped in the alternate concave and convex form (corrugated form) and in that a height D of 4 to 6 $\mu m$ defined between the crest and the bottom thereof is made equivalent to or more than the longest wavelength of the luminance signals and the color signals existing in video signals which are recorded onto the magnetic tape. For example, in a case of 8 milimeter type video, regarding the signals involved in the image, the wavelength of color signals which was converted into a low frequency is the longest, that is, about 5 $\mu m$. Consequently, in this case, the height of the corrugation is made not less than 5 $\mu m$. By adopting this constitution, the color signals which are picked up as interface signals at the point A on the junction portion 8, for example, become having an inversed phase in comparison with other interface signals which are picked up at a point B at which the distance L therebetween corresponds to the half wavelength, with the result that they are negated each other, causing no disturbance. As described above, since at points on the junction portions 8 and 8' between magnetic cores 1 and 2 and magnetic alloys 3 and 4 which points are separated by the half wavelength, the interface signals have respectively inversed phases with each other, they are negated as a whole, so that the disturbance caused by the pseudo-gap can be eliminated. Further, the magnetic head according to the invention is characterized in that the distance P of about 20 $\mu m$ defined between adjacent two crests or bottoms of the corrugation is made smaller than the track width W of about 30 $\mu m$ of the head. Consequently, every points on the junctions 8 and 8' will have a point which is offset by the half wavelength somewhere on the junction portion, which therefore allows to negate the interface signals. By the way, as in the 8 milimeter type video, when the record of the video signal onto the magnetic tape is partially overwritten, the above distance P is preferably made smaller than the effective width of the track which is recorded onto the magnetic tape.

The present invention also provides a method for readily making the magnetic head having features as specified above. One example of the method is hereinafter described with reference to FIG. 3 and so on. First, as shown in FIG. 3 (a), a parallel slit-like resist coating layer 26 having a smaller pitch P of about 20 $\mu m$ than the track width of the video head was formed on the surface A of the Mn-Zn ferrite substrate 25. Next, the ferrite substrate thus obtained was subjected to the electrolytic etching within the electrolytic solution, with the result that, as shown in FIG. 3 (b), a parallel slit-like corrugation was formed on the surface Q and the surface of the ferrite substrate 25 exhibits a corrugated surface Q'. Then, the pitch P of about 20 $\mu m$ of the corrugation becomes equal to the pitch P of the parallel slit-like resist coating film. Furthermore, the height D of 4-6 $\mu m$ of the corrugation can be controlled by the period of time of the electrolytic etching and, as shown above, is made equal to or more than the value of the longest wavelength existing in the video signals which are recorded on the magnetic tape. Next, as shown in FIG. 3 (c), the magnetic alloy 27 having a high saturation magnetic flux density such as an amorphous one was deposited by sputtering to have an appropriate thickness E of 30–40 μm on the surface Q'. In this case, it is necessary that the thickness E of magnetic alloy 27 is greater than the height D of the corrugation of the surface Q'. Subsequently, as shown in FIG. 3 (d), after the surface of the layer 27 of the magnetic alloy had been flattened by polishing, notched grooves 29 were provided, as shown in FIG. 3 (e), at one edge 28 of the magnetic alloy 27 to thereby form track portions 30. The width of the track portion 30 was made equal to the width W of about 30 μm of the track of the head. When the track portion 30 was formed, there is no limitation regarding the positional relationship between the corrugation present at the junction portion located between the ferrite and the magnetic alloy and the track portion 30, because in the track portion 30 there is included a corrugation having at least one cycle in view of the fact that the distance P' of about 20 μm between adjacent two crests or bottoms thereof is smaller than the width W of about 30 μm of the track portion 30. Then, as shown in FIG. 3 (f), the molten glass was filled into the notched grooves 29. As the occasion demands, a groove 32 may be provided rearwardly of the ferrite substrate 25, in which groove the glass 31 can be also filled. Subsequent thereto, by polishing the surface of the magnetic alloy layer 27, the overcoated excessive glass on the cut-in groove was removed, while the surface of the magnetic alloy layer 27 was finished to have a very smooth surface like mirror. Both the substrate thus made and another substrate obtained by joining the ferrite and magnetic alloy in the same manner as described above and provided with a groove 33 for coil winding are prepared, a gap material such as $SiO_2$ or the like being provided by sputtering in the predetermined thickness on the surface of the mirror-finished face of at least one of those substrates, and a gap bar having the gap 34 is made by bonding both substrates via the gap material, as shown in FIG. 3 (g).

Then, as shown by the dotted line 35, the magnetic head according to the invention was obtained by cutting the gap bar through the substantially central portion of the notched grooves 29 at a predetermined angle relative to the gap 34.

Figure 4:
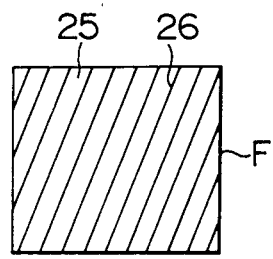
FIGS. 4 and 5 show another embodiment, wherein the corrugated portions are defined on the ferrite substrate.
Figure 5:
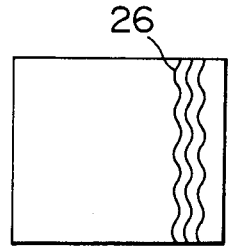
Figure 6:
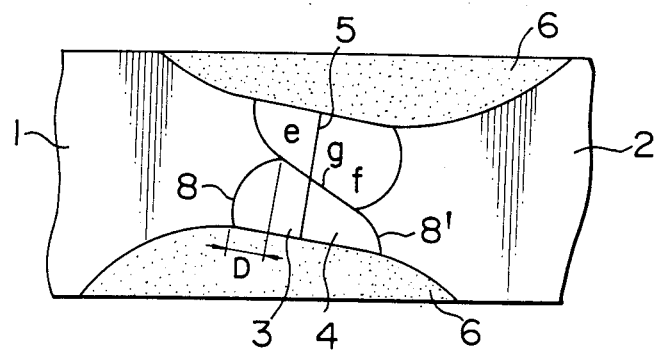
FIG. 6 shows an enlarged view, illustrating the gap portion of the sliding contact surface of the head which is one of the features of the invention.

Although, in FIG. 3 (b), the corrugation of the substrate 25 is defined parallel to the surface F, the parallel-slit-like resist coating film 26 may be formed at a certain angle relative to the surface F, as shown in FIG. 4. Furthermroe, the parallel slit-like resist coating film need not be rectilinear but may be curved as shown in FIG. 5 without nullifying the advantage obtained in the invention. As shown in FIGS. 4 and 5, since the corrugation is formed onto the surface of the ferrite substrate of FIG. 3 by using the large flat ferrite substrate and the magnetic alloy was deposited onto the surface of the corrugation by sputtering, it becomes possible to improve the efficiency of the mass production system. Furthermore, in the manufacturing process of the head, points e and f of the convex portion of the ferrite surface can be formed in the sharp angle protrusion, as shown in FIG. 6, by properly selecting the conditions of electrolytic etching. When points of convex portions e and f are made to have a sharp angle, the height D thereof can be enlarged to reduce the affect of the pseudo-gap to a great extent.

Figure 7A:
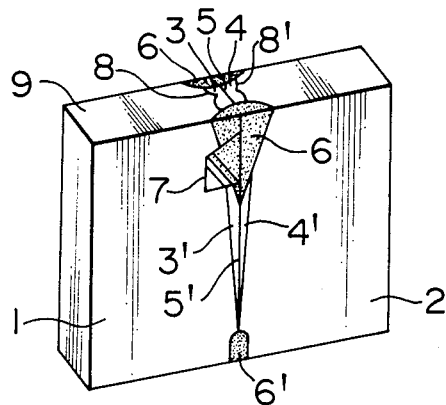
FIGS. 7a and 7b show perspective views, illustrating another embodiment of the magnetic head according to the invention, FIGS. 8 (a) and (b) show explanatory views of a part of the process for manufacturing the magnetic head having the construction depicted in FIG. 7.
Figure 7B:
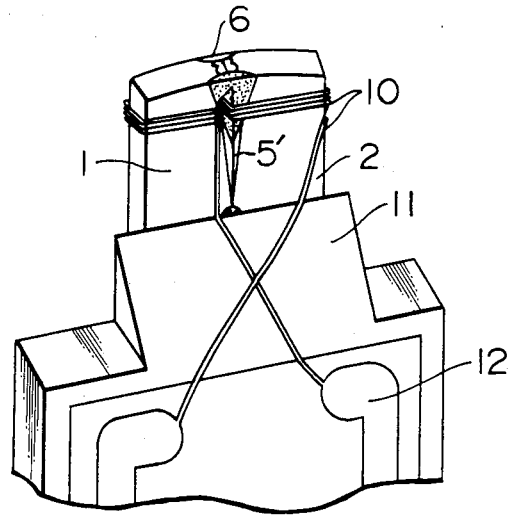
Figure 8A:
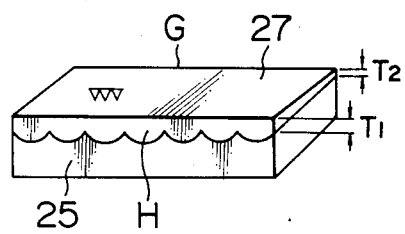
Figure 8B:
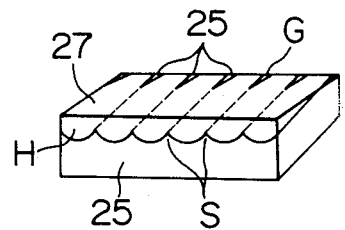

The second feature of the present invention is that positions of the convex portions e and f are made asymmetricl relative to the head gap 5. Namely, convex portions e and f are provided at positions where a straight line connecting convex portions e and f does not intersect at a right angle with the head gap 5. In case points of convex portions e and f form sharp angle, the magnetic potential of the protrusion can be increased, so that convex portions e and f are apt to act as gap. However, since, in this invention, the straight line g does not intersect at a right angle with the head gap 5, i.e. forms a certain angle relative to the direction in which the signal recorded onto the magnetic tape is magnetized, interface signals are hardly picked up due to the azimuth loss. When in the manufacturing process of the head in FIG. 3 (e) the track portion 30 is formed, the track portion can be formed irrespectively of the position of the convex portions provided in the junction position between the ferrite substrate 25 and the magnetic alloy 27. Consequently, when the gap bar is formed, as shown in FIG. 3 (g), by making the left and right cores butt against each other, since the position of the convex portion, which is provided at the junction portion between the ferrite material on the magnetic cores and the magnetic alloys, are respectively freely defined, they scarcely have a symmetrical position relative to the gap. Namely, since, in most cases, the line which connects the points of the convex portions on the left and the right magnetic cores does not intersect at a right angle with the gap, it becomes possible to obtain a magnetic head having a construction of FIG. 6 in which interface signals are hardly picked up. FIGS. 7a and 7b show another embodiment of the magnetic head according to the invention in which FIG. 7a there are removed magnetic coils 10 and terminals 12, wherein the performance of the head is improved. The feature of the embodiment, depicted in FIG. 7 is that the thickness of magnetic alloys 3' and 4' disposed on both side of the rear gap 5' is made smaller than that of magnetic alloys 3 and 4 disposed on both sides of the head gap 5. Small thickness of magnetic alloys 3' and 4' can reduce the eddy current loss at that portion, thus improving the reproducing efficiency by the head. To obtain the head shown in FIG. 7, in place of the step shown in FIG. 3 (d) wherein the polishing of the magnetic alloy material provided on the ferrite substrate 25 is shown, the surface of the magnetic alloy on the ferrite substrate 25 is polished in such a way shown in FIG. 8 (a) that the surface of the magnetic alloy 27 was flattened and inclined so that the thickness $T_1$ of 10–25 μm at side H of the magnetic alloy was made greater than that $T_2$ of 0–5 μm at the rear portion thereof. In this case, more preferably, the inclination of the magnetic alloy was made greater during polishing, as shown in FIG. 8 (b), such that in the vicinity of the rear portion G the protruding portion S of the ferrite substrate 25 was exposed to the surface of the magnetic alloy 27. Then, the head track was formed on the side of magnetic alloy having a greater thickness.

Figure 9A:
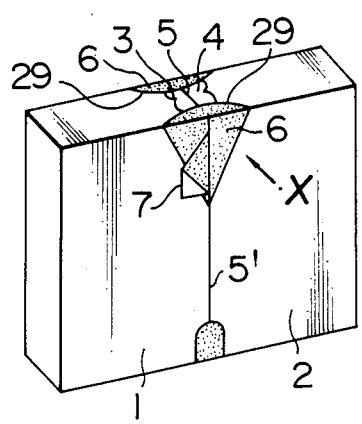
FIGS. 9a and 9b are perspective view of another embodiment of the magnetic head embodying the present invention.
Figure 9B:
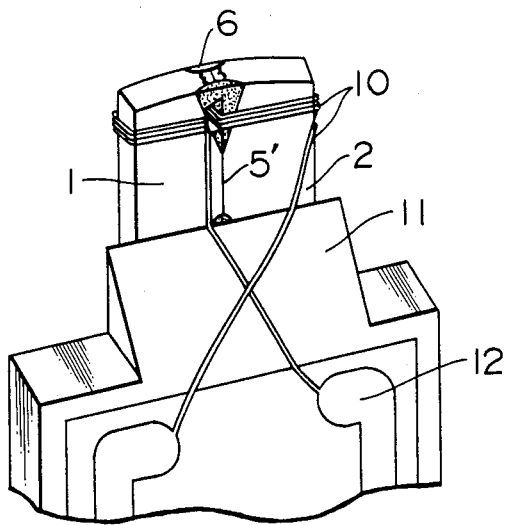
Figure 10:
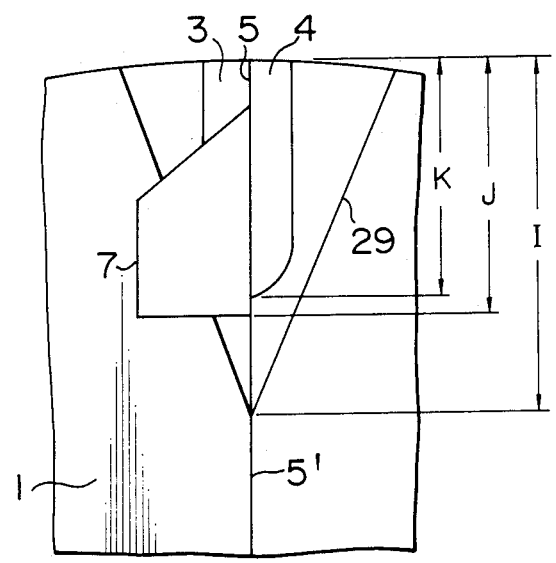
FIG. 10 is a partially enlarged view of a gap portion of the head shown in FIG. 9, and FIGS. 11a, 11b, 11c, 11d and 11e are drawings illustrating a process of producing the magnetic head of FIG. 9.
Figure 11A:
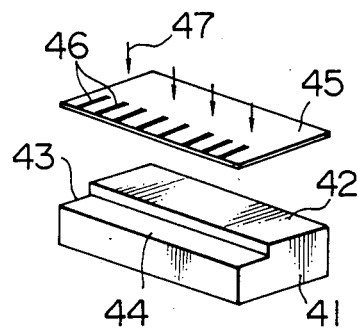
Figure 11B:
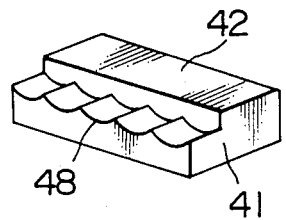
Figure 11C:
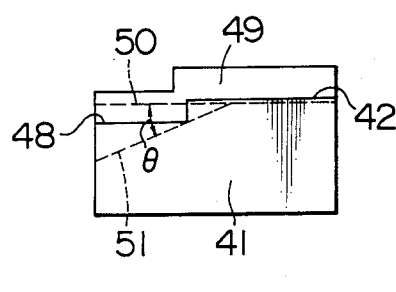
Figure 11D:
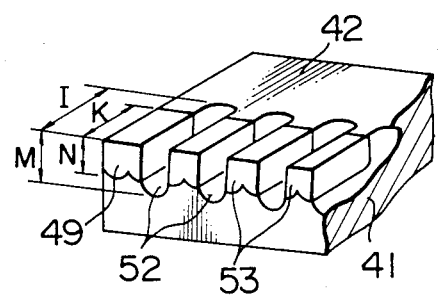
Figure 11E:
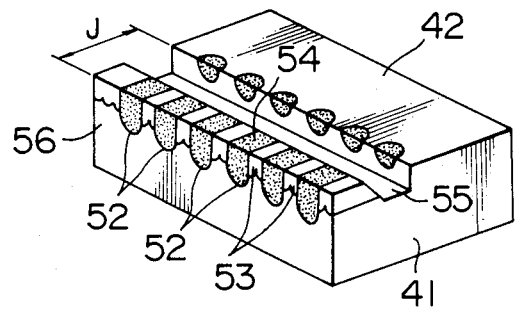

FIGS. 9a and 9b show still another embodiment of the composite type magnetic head composed of the ferrite magnetic material and the magnetic alloy such as the amorphous one magnetic alloy in which FIG. 9a there are removed magnetic coils 10 and terminals 12, which is excellent in the performance of recording and reproducing and is readily produced. In this embodiment, magnetic alloys 3 and 4 were disposed only on both sides of the head gap 5 and not at the portion of the rear gap 5'. FIG. 10 shows an enlarged view when the gap portion is viewed from the direction of the arrow X, wherein a bonding material 6 was removed. 29 denotes a notched groove restricting the width of track of the head. The length K of 800–900 μm of magnetic alloys 3 and 4 disposed on both sides of the gap 5 which extends from the surface of the head to the depth of the gap was set to be shorter than a distance J of 700–800 μm defined between the surface of the head and the lower end of the window 7 for coil winding and shorter than the distance I of 500–600 μm defined between the surface of the head and the lower end of the notched groove 29 restricting the width of the track. In this manner, the magnetic alloy having the high saturation magnetic flux density such as the amorphous one was only disposed on the gap portion 5, with the result that during recording there can be obtained a recording magnetic field sufficiently high to effect the recording even with respect to the metal tape having a high Hc. Besides, since the magnetic alloy is not disposed at the portion of back gap 5'. the loss caused during reproducing can be reduced compared with the prior embodiment, providing the greater reproduced signals. FIG. 11 shows an example of the manufacturing process of the magnetic head depicted in FIG. 9. First, as shown in FIG. 11 (a), by mechanical processing or chemical etching or the like, a recessed portion 43 was defined on a part of one surface 42 of the block 41 of the ferrite magnetic material to define a stepped portion 44. Next, the resist film was applied on the surface 42 of the ferrite block 41 and on the surface of the stepped portion 44, a mask 45 having a parallel slit-like pattern 46 was superimposed thereonto and the pattern 46 was printed onto the stepped portion 44 by radiating the light 47. In this state, the material thus obtained was subjected to the electrolytic etching, as shown in FIG. 3 (b), so that the corrugated surface 48 was formed on the surface of the stepped portion 44 while the surface 42 was maintained in the state of original plane surface without undergoing the etching action. Next, as shown in FIG. 11 (c), the magnetic alloy 49 such as the amorphous one was deposited by sputtering onto the plane 42 of the ferrite block 41 and on the corrugated surface 48. Subsequently, the surface of the magnetic alloy 49 was polished up to a position as indicated by the dotted line 50 to obtain the magnetic core block in which the magnetic alloy 49 is left on the corrugated surface 48 and in which the magnetic alloy was removed regarding the surface 42. Next, grooves restricting the track which grooves form a predetermined angle θ of about 12° relative to the polished surface 50 and reach the ferrite material 41 was provided, as shown by the dotted line 51, on the magnetic alloy 49 on the above corrugated surface 48 to obtain the half body of the magnetic core having a shape as depicted in FIG. 11 (d). In other words, in FIG. 11 (d), track restricting grooves 52 are sequentially defined within the magnetic alloy 49 to form the track portion 53. The depth M of 150–200 μm of the groove 52 was made greater than the thickness N of 10–25 μm of the magnetic alloy 49, while the length I of the groove 52 was made greater than the length K of the magnetic alloy 49. Subsequent thereto, the non-magnetic material 54 such as the glass or the like is filled into the grooves 52. Then, as shown in FIG. 11 (e), the window 55 for coil winding was provided on the surface 42. The distance between the lower end of the window 55 and the front surface 56 of the block 41 was made shorter than the length I of the track defining grooves 52. After those steps, the same step as shown in FIG. 3 (f) was effected and the magnetic head shown in FIG. 9 was obtained. When, as shown in FIG. 11 (e), a magnetic alloy is only disposed at the portion of the head gap to thereby provide a gap bar by use of the resultant half bodies of the magnetic core so that a magnetic head chip is obtained by cutting the gap bar, since no magnetic alloy is cut during the above operation, damage of the head or occurence of cracks caused by the blinding of the cutter can be prevented and the mass production is achieved with a high yield.

It is further understood by those skilled in the art that the foregoing description is made as to preferred embodiments of the disclosed invention and that various changes and modifications may be made according to the invention without departing from the spirit and scope thereof.

What is claimed is:

1. A method of producing a magnetic head, comprising:
   (a) forming on a face of a parallelopipedonshaped block made of a high permeability ferrite a resist coating film having parallel slits therein, said slits having a pitch smaller than a track width of said magnetic head and subjecting said block to electrolytic etching with an electrolytic solution to form a corrugation having a height not les than a value of a longest wavelength of luninance signals and color signals recorded on a tape;
   (b) providing a layer of a magnetic alloy by sputtering on said corrugation;
   (c) providing grooves in the magnetic alloy and said block along an edge of said magnetic alloy layer, each of said grooves extending substantially parallel to said corrugation to define a track having a predetermined width;
   (d) filling said grooves with a non-magnetic material and polishing said magnetic alloy layer and said non-magnetic material in said grooves to form a mirror-like face to thereby provide a first magnetic core portion;
   (e) preparing a second magnetic core in accordance with steps (a)–(d), providing a groove for a coil winding on said mirror-like face of said second magnetic core portion, and providing a gap material having a predetermined thickness on said mirror-like face of at least one of said first and second magnetic core portions;
   (f) bonding said first and second magnetic core portions through the gap material so that the tracks of said first and second magnetic core portions abut each other, to thereby form a gap bar having a gap between the first and second magnetic core portions; and
   (g) severing said gap bar at a predetermined angle relative to said gap.

2. The method claim 1 wherein said magnetic alloy is an amorphous magnetic alloy.

3. a method of making a magnetic head, comprising:
   (a) forming a stepped portion by removing a part of a surface of a parallelopipedon-shaped block made of a high permeability ferrite magnetic material;
   (b) forming a resist coating film on said stepped portion, said film having parallel slits therein, said slits having a pitch smaller than track width of said magnetic head;
   (c) subjecting the ferrite block to electrolytic etching with an electrolytic solution so that a corrugation is formed at said stepped portion, said corrugation having a height greater than or equal to a value of a longest wavelength of luminance signals and color signals which are recorded on a magnetic tape;

(d) forming a layer of magnetic alloy by sputtering in a predetermined thickness on said corrugation;

(e) forming a track having a predetermined width by providing grooves in an edge of said stepped portion which edge includes the magnetic alloy layer, each of said grooves extending substantially parallel to said corrugation;

(f) filling said grooves with a non-magnetic material and then polishing said magnetic alloy layer and said non-magnetic material to provide a mirror-like surface thereby to make a firt magnetic core so that the magnetic alloy layer remains on the stepped portion while the ferrite is exposed at portions other than said stepped portion;

(g) preparing a second magnetic core in accordance with steps (a)–(f) while providing a groove for a coil winding on said mirror-like face of said second magnetic core, and providing a gap material of a predetermined thickness on the mirror-like face of at least one of the first and second magnetic cores;

(h) forming a gap bar having a gap between both said first and second magnetic cores by bonding said first and second magnetic cores through surfaces between the first and second magnetic cores by use of said gap material while said tracks are butted against each other; and (i) severing said gap bar at a predetermined angle relative to said gap.

4. The method of claim 3 wherein said magnetic alloy is an amorphous magnetic alloy.

* * * * *

UNITED STATES PATENT AND TRADEMARK OFFICE
CERTIFICATE OF CORRECTION

PATENT NO. : 4,769,898

DATED : September 13, 1988

INVENTOR(S) : Mitsuaki ONO, et al

It is certified that error appears in the above-identified patent and that said Letters Patent is hereby corrected as shown below:

In the heading under "[30] Foreign Application Priority Data", add:

--May. 20, 1985 [JP] Japan ........... 60-107372--,

--Jul. 4, 1985 [JP] Japan ........... 60-147564--, and

--Feb. 27, 1986 [JP] Japan ........... 61-42239--.

Signed and Sealed this

Twentieth Day of June, 1989

Attest:

DONALD J. QUIGG

Attesting Officer

Commissioner of Patents and Trademarks